(12) United States Patent
Sierra

(10) Patent No.: US 11,769,138 B2
(45) Date of Patent: Sep. 26, 2023

(54) METHOD FOR PROCESSING MULTIMODAL MOBILE DONATIONS VIA TEXT MESSAGE AND EMAIL COMMUNICATION

(71) Applicant: SWOOP IP HOLDINGS LLC, Wilmington, DE (US)

(72) Inventor: Gabriel L. Sierra, Washington, DC (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 1120 days.

(21) Appl. No.: 15/439,607

(22) Filed: Feb. 22, 2017

(65) Prior Publication Data

US 2017/0308888 A1 Oct. 26, 2017

Related U.S. Application Data

(63) Continuation of application No. 13/794,090, filed on Mar. 11, 2013, now abandoned.

(60) Provisional application No. 61/612,789, filed on Mar. 19, 2012.

(51) Int. Cl.
*G06Q 20/32* (2012.01)
*G06F 40/295* (2020.01)
*G06Q 30/02* (2023.01)
*G06Q 30/0279* (2023.01)

(52) U.S. Cl.
CPC ....... *G06Q 20/3255* (2013.01); *G06F 40/295* (2020.01); *G06Q 20/322* (2013.01); *G06Q 30/0279* (2013.01)

(58) Field of Classification Search
CPC .......... G06Q 20/3255; G06Q 30/0279; G06Q 20/322; G06F 40/295
See application file for complete search history.

(56) References Cited

U.S. PATENT DOCUMENTS 5,426,781 A 6/1995 Kaplan et al.
5,664,110 A 9/1997 Green et al.
5,694,546 A 12/1997 Reisman
(Continued)

FOREIGN PATENT DOCUMENTS

CN 101167100 A * 4/2008 ......... G06Q 20/0855
CN 101454795 A * 6/2009
(Continued)

OTHER PUBLICATIONS

IP.IQ.com Search. (Year: 2021).*
(Continued)

*Primary Examiner* — Tan D Nguyen
(74) *Attorney, Agent, or Firm* — Volpe Koenig

(57) ABSTRACT

A donation processing system receives a text message from a donor indicating that they would like to make a donation to a non-profit organization. In response to the text message, a response message indicating the particulars of the donation including the donation amount and the non-profit organization is sent to the user. The donor reviews the information and, if the information is correct, a confirmation message is sent from the donor in response to the response message. The confirmation message confirms the donation. The donation is then made to the non-profit organization in response to the confirmation message.

15 Claims, 14 Drawing Sheets

(56) References Cited

U.S. PATENT DOCUMENTS

| | | | |
|---|---|---|---|
| 5,706,442 A | 1/1998 | Anderson et al. | |
| 5,710,887 A | 1/1998 | Chelliah et al. | |
| 5,758,328 A | 5/1998 | Giovannoli | |
| 5,793,972 A | 8/1998 | Shane | |
| 5,794,206 A | 8/1998 | Wilkinson et al. | |
| 5,799,157 A | 8/1998 | Escallon | |
| 5,809,242 A | 9/1998 | Shaw et al. | |
| 5,825,881 A | 10/1998 | Colvin, Sr. | |
| 5,826,242 A | 10/1998 | Montulli | |
| 5,826,269 A | 10/1998 | Hussey | |
| 5,838,790 A | 11/1998 | McAuliffe et al. | |
| 5,848,397 A | 12/1998 | Marsh et al. | |
| 5,855,008 A | 12/1998 | Goldhaber et al. | |
| 5,864,823 A | 1/1999 | Levitan | |
| 5,870,717 A | 2/1999 | Wiecha | |
| 5,890,138 A | 3/1999 | Godin et al. | |
| 5,897,622 A | 4/1999 | Blinn et al. | |
| 5,899,980 A | 5/1999 | Wilf et al. | |
| 5,905,973 A | 5/1999 | Yonezawa et al. | |
| 5,970,469 A | 10/1999 | Scroggie et al. | |
| 6,101,485 A | 8/2000 | Fortenberry et al. | |
| 6,167,435 A | 12/2000 | Druckenmiller et al. | |
| 6,246,996 B1 | 6/2001 | Stein et al. | |
| 6,529,881 B2* | 3/2003 | Morganstein | H04M 3/51 704/251 |
| 6,938,048 B1 | 8/2005 | Jilk et al. | |
| 6,954,737 B2 | 10/2005 | Kalantar et al. | |
| 6,993,559 B2 | 1/2006 | Jilk et al. | |
| 7,533,064 B1 | 5/2009 | Boesch | |
| 7,577,587 B2 | 8/2009 | Gee | |
| 7,912,910 B2 | 3/2011 | Banerjee et al. | |
| 7,917,576 B1* | 3/2011 | Kling | H04L 51/066 709/203 |
| 8,156,012 B1 | 4/2012 | Eisner et al. | |
| 8,516,063 B2 | 8/2013 | Fletcher | |
| 8,538,845 B2 | 9/2013 | Liberty | |
| 8,606,703 B1 | 12/2013 | Dorsey et al. | |
| 8,725,635 B2 | 5/2014 | Klein et al. | |
| 8,762,272 B1 | 6/2014 | Cozens et al. | |
| 9,189,785 B2 | 11/2015 | Liberty et al. | |
| 9,208,488 B2 | 12/2015 | Liberty | |
| 9,892,386 B2 | 2/2018 | Liberty | |
| 10,395,223 B2 | 8/2019 | Muthu et al. | |
| 10,515,345 B2 | 12/2019 | Koh et al. | |
| 2002/0010746 A1 | 1/2002 | Jilk et al. | |
| 2002/0026348 A1* | 2/2002 | Fowler | G06Q 30/0208 705/14.13 |
| 2002/0049612 A1* | 4/2002 | Jaeger | G16H 10/60 705/2 |
| 2002/0065828 A1 | 5/2002 | Goodspeed | |
| 2002/0091538 A1* | 7/2002 | Schwartz | G06Q 30/0601 705/329 |
| 2002/0103752 A1 | 8/2002 | Berger et al. | |
| 2002/0120581 A1 | 8/2002 | Schiavone et al. | |
| 2002/0178360 A1 | 11/2002 | Wenocur et al. | |
| 2003/0120614 A1 | 6/2003 | Shumpert | |
| 2003/0217107 A1 | 11/2003 | Parry | |
| 2004/0024655 A1 | 2/2004 | Estes | |
| 2005/0044003 A1 | 2/2005 | O'Keeffe et al. | |
| 2005/0251460 A1 | 11/2005 | Quigley | |
| 2006/0253335 A1 | 11/2006 | Keena et al. | |
| 2007/0022007 A1 | 1/2007 | Lawe | |
| 2007/0203836 A1* | 8/2007 | Dodin | G06Q 20/02 705/44 |
| 2007/0255620 A1 | 11/2007 | Tumminaro et al. | |
| 2007/0265006 A1* | 11/2007 | Washok | G06Q 30/02 455/435.1 |
| 2009/0006233 A1 | 1/2009 | Chemtob | |
| 2009/0144188 A1* | 6/2009 | Colabucci | G06Q 40/03 705/38 |
| 2009/0254447 A1 | 10/2009 | Blades | |
| 2009/0276345 A1 | 11/2009 | Hughes | |
| 2009/0281871 A1* | 11/2009 | Tietzen | G06Q 30/0236 705/14.3 |
| 2010/0010886 A1 | 1/2010 | Flynn, Jr. | |
| 2010/0029249 A1 | 2/2010 | Bilstad et al. | |
| 2010/0042484 A1* | 2/2010 | Sipes | G06Q 30/0276 705/14.4 |
| 2010/0070419 A1 | 3/2010 | Vadhri | |
| 2010/0235276 A1* | 9/2010 | Smith | G06Q 20/32 705/40 |
| 2010/0306154 A1* | 12/2010 | Poray | H04L 12/4625 706/47 |
| 2011/0173094 A1* | 7/2011 | Krueger | G06Q 30/08 705/26.41 |
| 2011/0202615 A1 | 8/2011 | Fletcher | |
| 2011/0264555 A1 | 10/2011 | Turner-Rielle | |
| 2011/0295749 A1* | 12/2011 | Scalisi | G06Q 20/10 705/44 |
| 2012/0109781 A1 | 5/2012 | Felt et al. | |
| 2012/0130898 A1* | 5/2012 | Snyder | G06Q 20/4016 705/44 |
| 2012/0185545 A1* | 7/2012 | Ianni | G06Q 30/02 709/206 |
| 2012/0253896 A1 | 10/2012 | Killoran, Jr. et al. | |
| 2012/0253897 A1* | 10/2012 | Killoran, Jr. | H04L 51/18 705/14.4 |
| 2012/0276868 A1 | 11/2012 | Martell | |
| 2012/0323762 A1* | 12/2012 | Kapur | G06Q 20/425 705/39 |
| 2013/0059639 A1 | 3/2013 | Farah | |
| 2013/0103603 A1* | 4/2013 | Merriman | G06Q 30/0279 705/329 |
| 2013/0132568 A1* | 5/2013 | Dankar | B66C 13/18 709/224 |
| 2013/0197998 A1* | 8/2013 | Buhrmann | H04M 1/27 726/3 |
| 2013/0226804 A1* | 8/2013 | Weiss | G06Q 20/384 705/44 |
| 2014/0025599 A1* | 1/2014 | Killoran | G06Q 20/027 705/329 |
| 2017/0061079 A1* | 3/2017 | LaValley | G16H 50/20 |

FOREIGN PATENT DOCUMENTS

| | | | | |
|---|---|---|---|---|
| CN | 101568084 A | * | 10/2009 | |
| KR | 20070000010 A | * | 1/2007 | |
| KR | 20070000010 A | | 1/2007 | |
| WO | WO-0237433 A2 | * | 5/2002 | G06Q 30/06 |
| WO | 2006119342 A2 | | 11/2006 | |
| WO | WO-2007079054 A2 | * | 7/2007 | G06Q 20/10 |
| WO | WO-2010077960 A2 | * | 7/2010 | G06Q 30/06 |

OTHER PUBLICATIONS

GoogleScholar.com Search. (Year: 2021).*
Hogberg, Jonas, "Mobile Provided Authentication on the Web", Jan. 2012, Madrid R&D Centre Ericsson, pp. 1-6 (Year: 2012).*
Gunson, Nancie "User Perceptions of security and usability of single-factor and two-factor authentication in automated telephone banking", 2011, Computer & Security 30 (2011), pp. 208-220. (Year: 2011).*
Mohammed AlZomai, "An Experimental Investigation of the Usability of Transaction Authorization in Online Bank Security Systems", 2007, Australian Computer Society, Inc., pp. 1-9. (Year: 2007).*
Bojan Kotnik, "Design of Mobile Multimodal Communication Device—Personal Navigator", 2000, IEEE, pp. 337-340. (Year: 2000 ).*
Jonas Hogberg, "Mobile Provided Identity Authentication on the Web", 2012, Position Paper for W3C Work-Shop on Identity in the Browser, pp. 1-6. (Year: 2012).*
Truxa, IVO Miva® merchant: MmPGP Secure PGP Email Merchant Notification Module, http://mivo.truxoft.com/mm0001.htm, Jan. 21, 2011, pp. 1-10 *Cited in parent application.

* cited by examiner

METHOD FOR PROCESSING MULTIMODAL MOBILE DONATIONS VIA TEXT MESSAGE AND EMAIL COMMUNICATION

CROSS REFERENCE TO RELATED APPLICATION

This application is a continuation of U.S. patent application Ser. No. 13/794,090 filed Mar. 11, 2013, which claims the benefit of U.S. Provisional Application Ser. No. 61/612,789 filed on Mar. 19, 2012, which are incorporated by reference as if fully set forth herein.

FIELD OF INVENTION

The present invention generally relates to financial transaction in e-commerce. In particular, the invention relates to facilitating electronic donations to charitable organizations, political parties, educational institutions and other non-profit organizations made using e-commerce.

BACKGROUND

Many telecommunication carriers, such as but not limited to AT&T, TMobile, Verizon, Sprint, and other domestic and international carriers, help to facilitate donations via text messages on their respective networks. Fundraising via mobile devices, particularly cellular phones, is commonplace today and often experiences a surge in donation activity following some sort of event or natural disaster. Some examples of when this method was used include the tsunami in Japan, tornadoes in Joplin, Mo., and the earthquake in Haiti. Of course, many charities and non-profit organizations conduct fundraising activities on an ongoing basis using a multitude of approaches. However, in times of disaster or crisis, many nonprofit organizations make urgent, time sensitive pleas for donations in order to provide an immediate and heightened response effort for that particular incident.

Political organizations have also been introduced to the concept of electronic fundraising; particularly email solicitations. This type of fundraising became a force in U.S. politics in the 2012 presidential race due to the large amount of money that was raised. Although a typical donation to a political organization was very small, the sheer number of donations was large enough to make a sizable difference.

Donors often respond to a mass email campaign by contributing through online payments on an organization's website, by calling a toll-free number, or sending a check. Organizations are increasingly trying to find new ways to make it easier, better and faster for donors to contribute, so that the funds can quickly and efficiently get to where they are needed, when they are needed. Presumably, most individual donations to charities are processed through a credit card transaction as part of the organization's small or medium dollar fundraising program.

One of the innovations of the past decade or so is the capability to facilitate donations through text messages on a cellular phone. An organization can set up a special (5 digit) "phone number" for individuals to send a text message to and, thereby, complete small dollar donation. Typically, these donations are of a fixed amount, (i.e. each text message sent may equate to a $10 donation), which is added to the individual's phone bill. If the individual seeks to donate $50, they would have to send 5 text messages, and so on. The largest text message donation technology provider is www.mgive.com. It is estimated that an 85% of text message-based donations are processed through the mGive or its resellers. Text donations currently use 5 digit phone numbers called "short codes".

With traditional mobile text message donations, as shown in FIG. 1, the process 100 for text message charitable donations obviously begins with the organization setting up an account from which it will be able to receive mobile donations. Once established, mobile phone users can send donations, (set at a fixed $5 or $10 per message), to the organization by texting a predetermined message to the 5-digit phone number, 102. The cellular telecommunication network adds the donation to the user's cell phone bill, 104. The network transmits the message to mGive where it is processed, 106, and proceeds are later wired to the particular organization, 108; typically 90 or more days later.

Cellular donation technologies, in particular text message donations, make it easier for supporters to contribute to their favorite causes that have accounts with mGive or its competitors. Cellular mobile donations have proven to be very effective for fundraising campaigns, particularly in response to crises. Such successful examples include response efforts for the Japanese tsunami and Haitian earthquake, where hundreds of millions of dollars were raised through online and text message technology approaches.

There are many advantages to text message donating. These advantages include: 1) ease of use; not a complicated donation process, (such as no personal information or credit card entry, etc); 2) proactive donation ability without need of first receiving solicitation; 3) donation unconstrained by location, (donors can donate immediately when they see or hear an advertisement or a request); and 4) extremely large installed base of cellular and smartphone devices for mobile donations.

However, there are a number of obstacles and shortcomings associated with text message donations such as mGive. Notwithstanding the many advantages of text message donating, there are inherent disadvantages of text message donations as desired above. First, there is an extremely long delay from moment of donation to organization receiving funds, such as 90 days or more, which is wasted time that may be critical to the organization. For example, in times of crisis, the first 30 days is often the most important time for first responders. Likewise, 90 days in the life of a political organization can make the difference between the success or failure of the campaign.

Second, donations are charged to a donor's phone bill, which must be paid in full at the end of the month. Accordingly, much larger donations such as $100 or more are not as likely. Third, there is no flexibility in the amount of donations, therefore requiring donating multiple times if charitable donator wants to give more. This also has an effect of limiting the overall amount of donations. Fourth, the organization receives a lump sum funds with no transparency regarding who donated, which is not conducive to donor cultivation. Finally, upfront setup costs plus monthly costs and variable donation costs, such as outbound solicitations, are extremely high, and eat into the organizations' ultimate collection efforts.

In the text message donation scheme, since donations are small amounts, the total cost of donation processing is extremely high. Example costs to process a single unsolicited $5 donation may be as follows: 35 c+3.5%*$5=52.5 c=10.5% processing cost. To raise a $1 M in unsolicited donations, the total cost is: 200K texts*35 c+$1 M*3.5%=$99K=9.9% processing cost. Costs for outbound solicitations are even higher than these examples. To obtain donor information for cultivation is yet even more expensive. Fully integrated solutions with donor management and solicited or unsolicited email are extremely expensive and the organization still doesn't receive the funds until 90 days later or more.

One of the more serious drawbacks is that since the donations are charged to a phone bill, donors do not have the same protections if they want to challenge the charges since they will be doing that through the phone company instead of credit card issuer. Donors may be wary of sending electronic donation in this manner without any recourse or protection if the transaction is not legitimate or was made in error. In such a case, donors may decide that giving electronically is uncomfortable.

Accordingly, the present electronic methods of giving leave much to be desired on behalf of donors and charities.

SUMMARY

A donation processing system receives a text message from a user utilizing their mobile device, indicating that the user would like to make a donation in a particular amount to a particular charity. In response to the text message, a response message indicating the desired donation amount is sent to the user. The user then reviews the response message and if they are satisfied with the details therein, generates a confirmation message. The confirmation message is sent from the user to confirm the donation. A donation is made to a non-profit organization in response to the confirmation message.

BRIEF DESCRIPTION OF THE DRAWINGS

A more detailed understanding may be had from the following description, given by way of example in conjunction with the accompanying drawings wherein.

DETAILED DESCRIPTION

Figure 1:
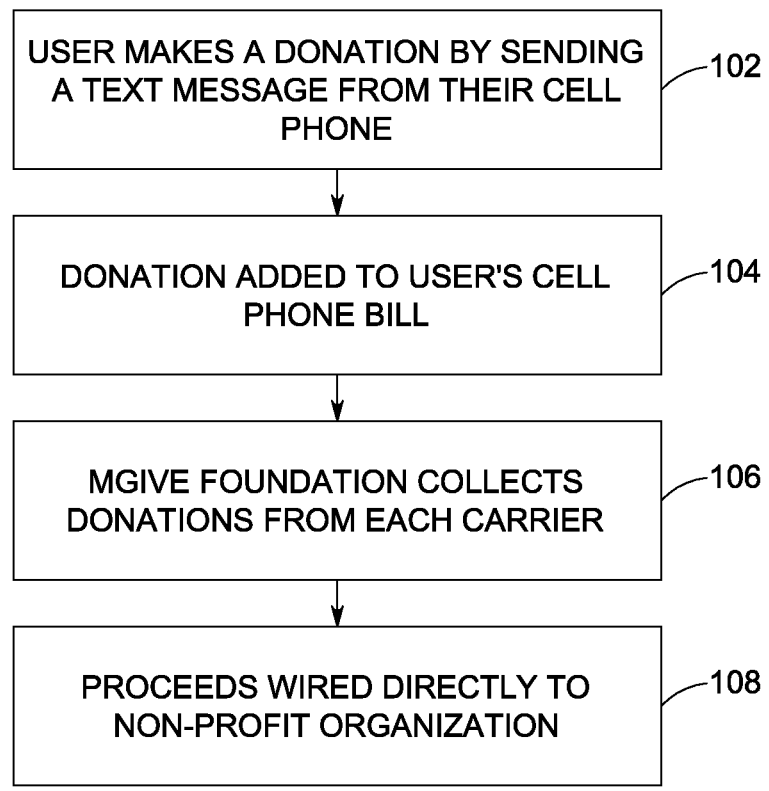
FIG. 1 is a flow diagram of a traditional text-based donation system.

The present invention will be described hereinafter with reference to the drawing figures were like numerals represent like elements throughout.

Technology services exist which allow for bidirectional mobile communication conversion between email and text messages. Available at no cost for the use of the conversion gateway, an email can be sent to a regular cellular phone, (as opposed to a "smart phone"), and a regular cellular phone can send a text message to a regular email address. Therefore, every regular cell phone (not pictured) also inherently has a corresponding email address by default.

The email address for a cellular phone is the 10-digit phone number with the domain determined by the carrier network. A basic (i.e. regular) cellular phone with the number 555-222-1234 on Verizon would have the email address 5552221234@vtext.com.

Below are the examples of the free domains by domestic carrier:

Alltel: phonenumber@message.alltel.com
AT&T: phonenumber@txt.att.net
T-Mobile: phonenumber@tmomail.net
VirginMobile: phonenumber@vmobl.com
Sprint: phonenumber@messaging.sprintpcs.com
Verizon: phonenumber@vtext.com
Nextel: phonenumber@messaging.nextel.com
US Cellular: phonenumber@mms.uscc.net A more universal approach is also available (www.webtext.com) which adds an extra level of flexibility at a determined price structure. Webtext supports various interface types between instant messages, text messages, email, contact databases and online connectivity.

With this capability, a person may send an email from, for example, their email account, such a Gmail, Yahoo, etc., to a cellular phone which would be received as a text message. Conversely, a cellular phone can send a text message to, for example, an email account where it would be received at that account as a regular email.

Some features which may be desirable for mobile financial transaction solutions would include some of the following characteristics: minimizes the time from donation or transaction to funds received by the organization or individual; functions on any mobile device, regardless of whether it is a basic cellular phone or a multifunctional and multi-featured smartphone; low cost; provides a return on investment (ROI); secure; easy for donors and organizations to use; enables solicited and unsolicited donations; minimizes non value-added tasks nor requires a "new way of operation"; can be integrated into any organization's donor management system with relevant donor information; and meets regulatory requirements (IRS reporting, Federal Election Commission, etc).

Figure 2:
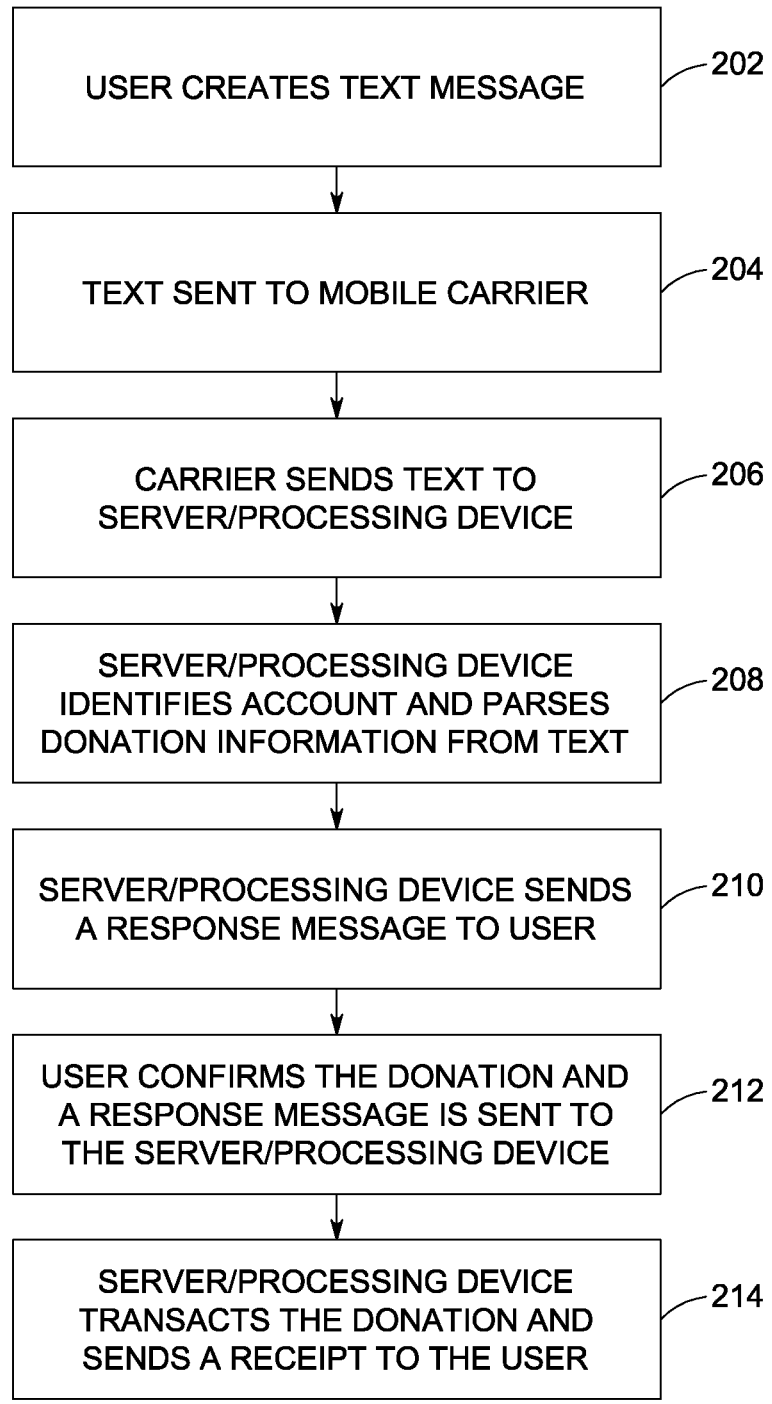
FIG. 2 is a flow diagram of a method for utilizing a text-based donation system.
Figure 3:
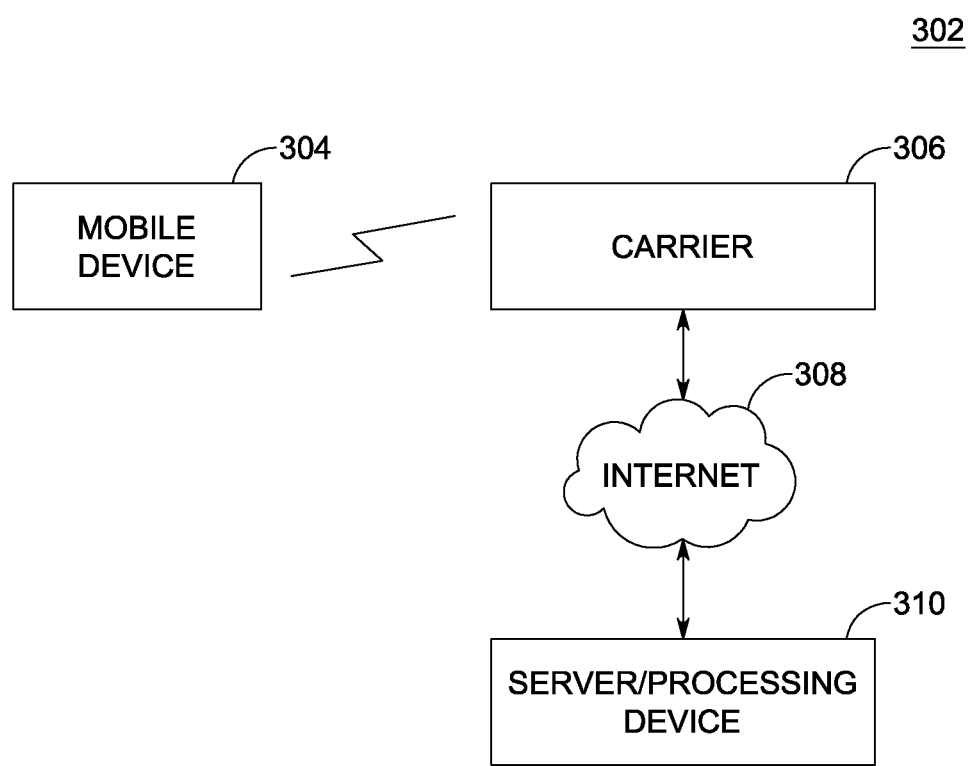
FIG. 3 is a graphical overview of the components of a text-based donation system.

FIG. 2 is an flow diagram of a method 200 for mobile donations using text messages and FIG. 3 is a system 302 implementing mobile donations using text messages. The present invention will be described with reference to both FIGS. 2 and 3. A user of a mobile device 304 identifies a non-profit entity, (which may be, by way of example and not by way of limitation, a charity, an educational institution, a political organization or any other type of non-profit entity), to which the user wishes to donate. Additionally, although the following is described in the context of non-profit entities, the following can be applied to entities other than non-profit entities such as, for example, commercial entities.

The user creates a text message, (step 202). The destination address of the text message is to a number of an organization associated with the intended donation, (such as a non-profit organization), a number associated with a particular fundraising effort for a particular non-profit organization, or a number associated with a non-profit organization or an organization handling donations for multiple non-profit organizations.

Figure 4:
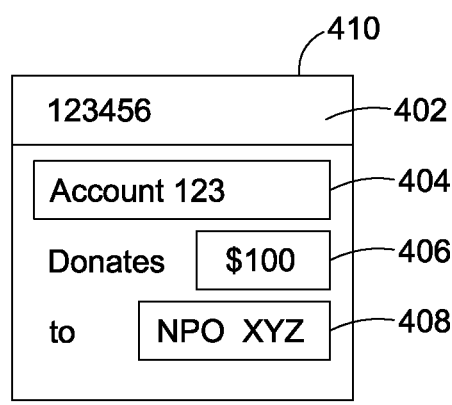
FIG. 4 is an example of a text message.

An example text message 410 is illustrated in FIG. 4. The text message 410 has a destination number 402, a name or identifier of the non-profit organization 408, a donation amount 406 and an account identifier 404 of the user. Although these four pieces of information are illustrated, all of them are not necessary for implementing the present invention, as more or less fields may be used. As those of skill in the art would appreciate, there are various other implementations that may be utilized. For example, if a single organization is associated with a destination number, the name or identifier of the non-profit organization 408 need not be included. Also, if the number of the mobile device is associated with a particular account, the account identifier 404 need not be included.

The destination number 402 of the text message 410 may be a 4 to 6 digit number, such as associated with conventional non-profit organization donations. The destination number 402 may alternatively be a conventional phone number, shorter than 4-digit number, or longer than a 4-digit number, including alpha and numeric combinations. Although the text message 410 is shown in the particular format shown in FIG. 4, it should be understood that the particular format modified in accordance with the teachings herein.

Referring back to FIG. 2, the text message 410 is sent from a mobile device 304 to the mobile carrier 306, (step 204). The mobile carrier 306 sends the text message 410 to the destination associated with the destination number 402, (or email address), which is typically carried over the Internet 308, (step 206). The text message 410 is received at the destination that is identified by the destination number 402, which may be a server or an alternate processing device 310. Although the following refers to a server or processing device, the implementation may be by multiple servers and/or processing devices.

The server/processing device 310 receives the text message 410 and identifies an account associated with the user, (step 208). The server/processing device 310 may identify the account number by utilizing a database that associates mobile device numbers with accounts.

In an alternative where users do not pre-register with the server/processing device 310, the server/processing device 310 may return a message back to the user of the mobile device 304 requesting credit card or other financial information. This alternative will be described in greater detail hereinafter. Once the user responds to this message and provides this information, the server/processing device 310 proceeds as described hereinafter.

In yet another alternative, the server/processing device 310 may identify the account from the account identifier in the body of the text message 410. The user may input the account identifier, which may comprise payment information such as credit card or other financial information.

If the text message 410 includes a donation amount 406, the server/processing device 310, parses the donation amount from the text message 410, (step 208). If the text message 410 includes a name or identifier of the non-profit organization 408, the server/processing device 310 parses the indication from the text message 410, (step 208).

If several non-profit organizations are associated with a destination number, the server/processing device 310 identifies the non-profit organization through the destination number 408 and the identifier of the non-profit organization 408. Alternatively, if the server/processing device 310 serves a single organization, then the destination number 402 and the identifier of the non-profit organization 408 are associated with the same entity. Therefore, the server/processing device 310 already knows the non-profit organization to which the text message 410 is intended.

Figure 5:
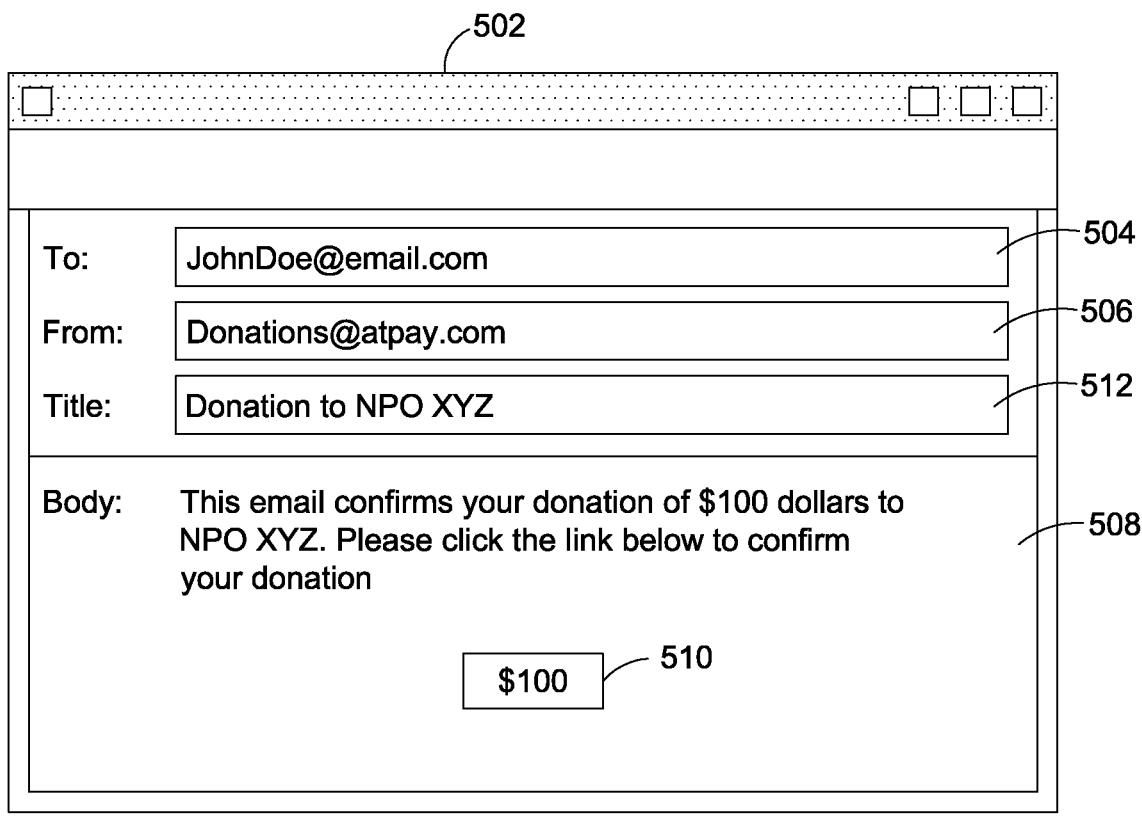
FIG. 5 is an example of a response message.

The server/processing device 310 sends a response message 502 back to the user, (step 210). An example of a response message 502 is shown in FIG. 5, which will be described in greater detail hereinafter. The response message 502 may be a response text message, an email message or a multimedia service (MMS) message. Alternatively, the response may be a tweet, an instant message, or a Facebook message or post.

It should be understood that the response message 502 is a security feature to ensure that the donation is really desired. In an alternative embodiment, steps 210 and 212 may be eliminated and the donation is processed after the first message is received at step 208. Further, although providing a receipt to the user at step 214 is a customary feature, this is also optional.

The response message 502 may include information associated with the donation, such as the non-profit organization, the amount of the donation and/or confirmation instructions. The confirmation instructions may request the user to send a reply text, email or MMS to confirm the donation. The confirmation instructions may request the user to click a link to confirm the donation.

The example email response message 502 is shown in FIG. 5. The email has a to address 504, a from address 506, a title 512, confirmation text with instructions 508 and a button (or link 510) to confirm the donation.

In an optional embodiment, If the user does not have an account, (i.e. has not registered with the server/processing device 310 and linked to a credit card or another type of electronic payment account), the server/processing device 310 sends the user a registration request message with instructions to register an account. The registration request message may include a link to a site to allow the user to register, or the message may include fields so that the user can provide registration information directly by replying to the registration request message. Alternatively, the email response message 502 may prompt the user for their credit card information. Once the user provides the information, an account for the user is automatically set up.

Referring back to FIG. 2, after the user has confirmed the donation, such as by sending a text, email or MMS or by clicking a link, (step 212), the server/processing device 310, (or an email-based donation processing server as will be explained in detail hereinafter with reference to FIG. 6), will initiate a transaction to make the donation for the user from the user's account, (step 214). A receipt for the donation may optionally be sent, (also part of step 214), to the user by sending a text or email (or any other type of electronic message).

Figure 6:
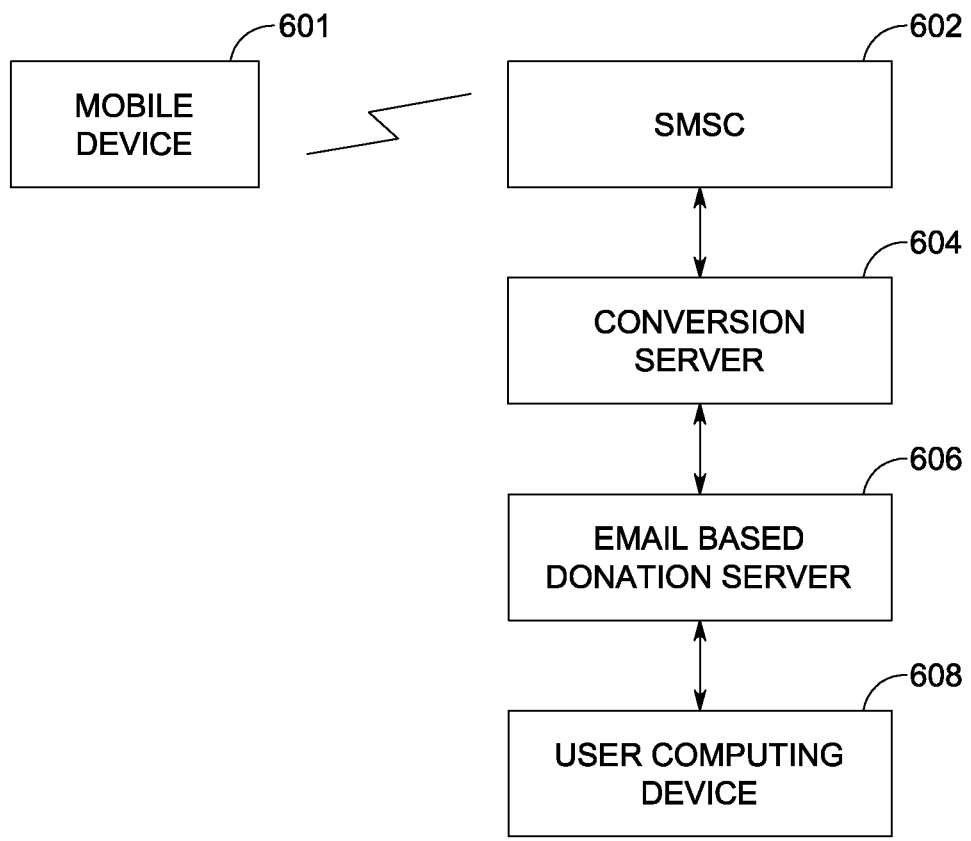
FIG. 6 shows components of a text-based donation system using an email-based backend.

FIG. 6 is a simplified system 600 for supporting text and email-based donations. It should be understood by those of skill in the art that although text and emails are described hereinafter with reference to the following example, other forms of electronic communication may also be utilized, such as instant messages, tweets, Facebook messages, and the like.

A mobile device 601 communicates with an SMS center (SMSC) 602 used by a wireless carrier 306. This communication may comprise a text, generated by a user of the mobile device 601, indicating that they would like to make a donation in a certain amount to a certain non-profit organization.

The SMSC 602 sends the SMS message to an email-to-SMS conversion server 604, which converts the SMS message to an email 700, (and also converts emails to SMS messages). The conversion server 604 may be also used to convert other first aforementioned forms of electronic communication to second aforementioned forms of electronic communications. The email 700 is sent to an email-based donation server 606 for processing the donation.

Figure 7:
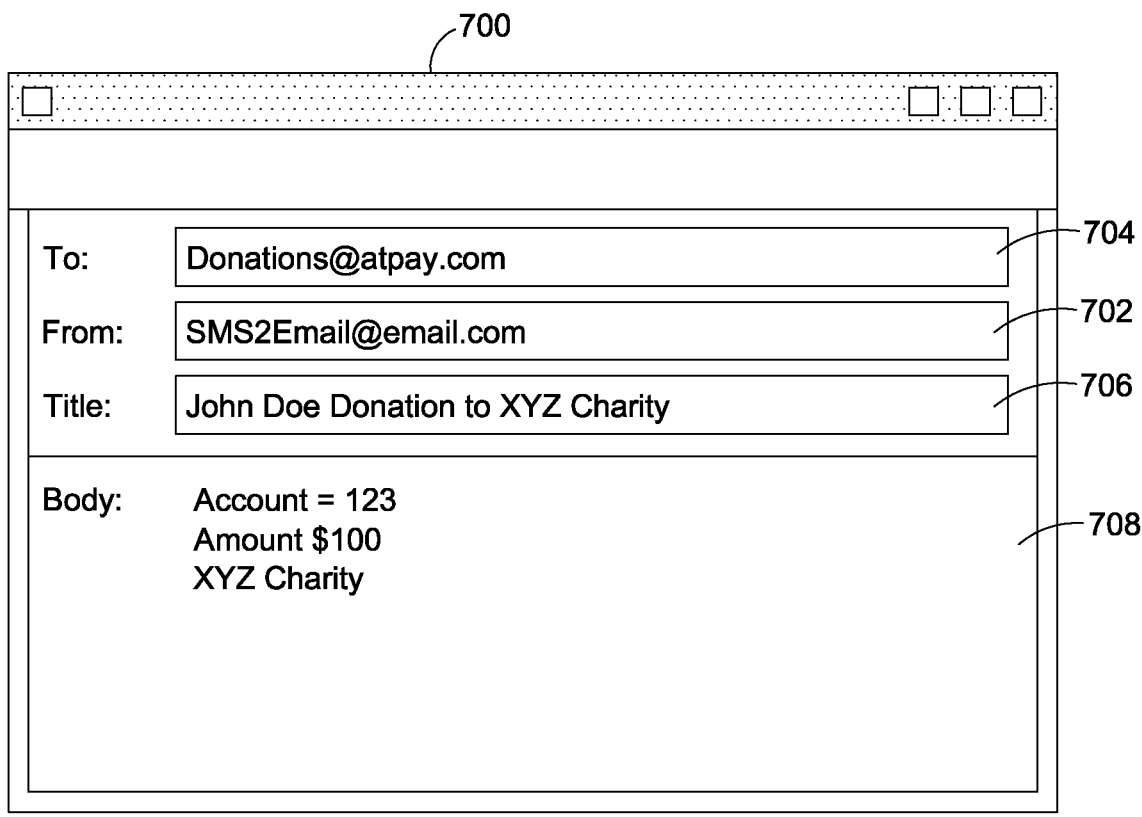
FIG. 7 is an example of an email used with the email-based backend.

Referring to FIG. 7, the email 700 has a to address 702 of the email donation processing system, a from address 704, a title 706, (such as "John Doe Donation to XYZ Charity"), and the body 708 of the email has donation-related information, such as an account identifier of the donor and an amount of the donation. The conversion server 604 alternately may create a mailto packet, to be sent as a packet or by email or text, with the cause, donor and amount. That packet is sent to the email-based donation server 604. The email-based donation server 606 processes the donation by charging the donation amount to the donor's credit card or other payment account. A response email may then be sent to an email address associated with account identified in the text message. The response email includes information associated with the donation, such as the non-profit organization, the amount of the donation and/or confirmation instructions.

In an alternative embodiment, in order to foster donor cultivation opportunities if the donor does not have an account with the email-based donation server 606, the body of the text message may include an email address of a donor (i.e. the user of the mobile device). The email-based donation server 606 then sends to the email address registration information to the donor, so that the donor can set up an account with the email-based donation server 606.

In an alternative embodiment, a confirmation step may be implemented for additional security. In this embodiment, a confirmation that the donor wants to make the specified donation in the specified amount to the specified non-profit organization is generated and sent to the donor, (this is similar to steps 210 and 212 in FIG. 2). In this embodiment, once the donation is processed, (i.e. the amount is charged to the donor's credit card or other account), the email-based donation server 606 sends the response message 502, (as shown in FIG. 5), to the donor, such as to the mobile device 601 or other computing device 608 to facilitate the donation. The donor then selects the button 510 to confirm the transaction.

It should be understood, that the SMSC 602, the conversion server 604, and the email-based donation server 606 may be implemented as separate physical components, or may be different software modules within the same physical component. Additionally, these components 602, 604, 606 may also be implemented as separate from the email-based donation system or may be implemented as a module of such a system.

In an alternative embodiment, after receiving the text message 402, the conversion server 604 may send the information to an email donation processing system, such as described in related U.S. patent application Ser. Nos. 13/074,222, 13/074,235 and 61/524,898, which are herein incorporated by reference as if fully set forth. It should be understood, that the SMSC 602, the conversion server 604, and the email-based donation server 606 may be implemented as separate from the email-based donation system or may be implemented as a module of such a system.

Figure 8:
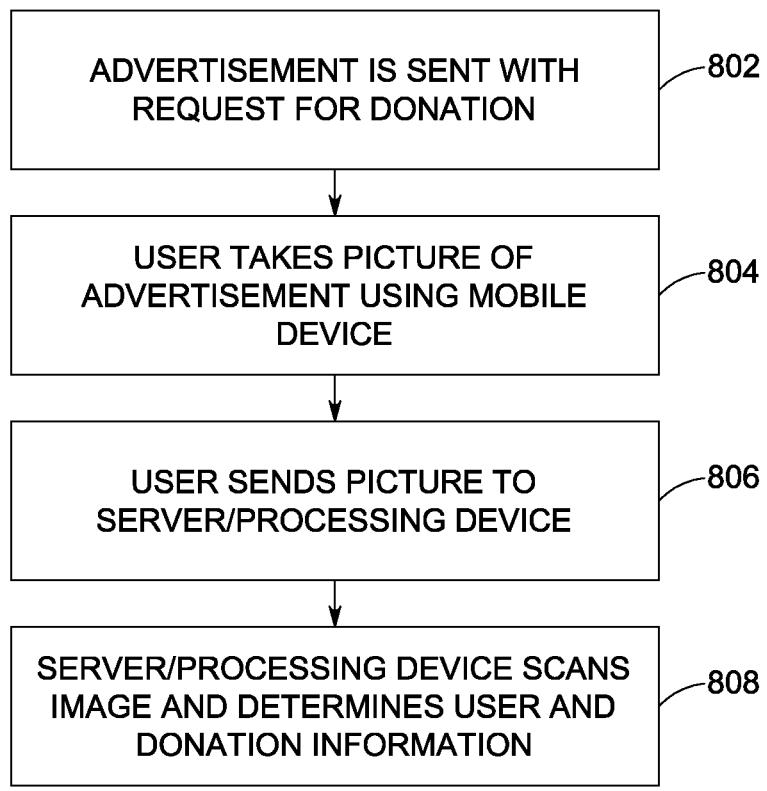
FIG. 8 is a flow diagram for a picture-based donation system.
Figure 9:
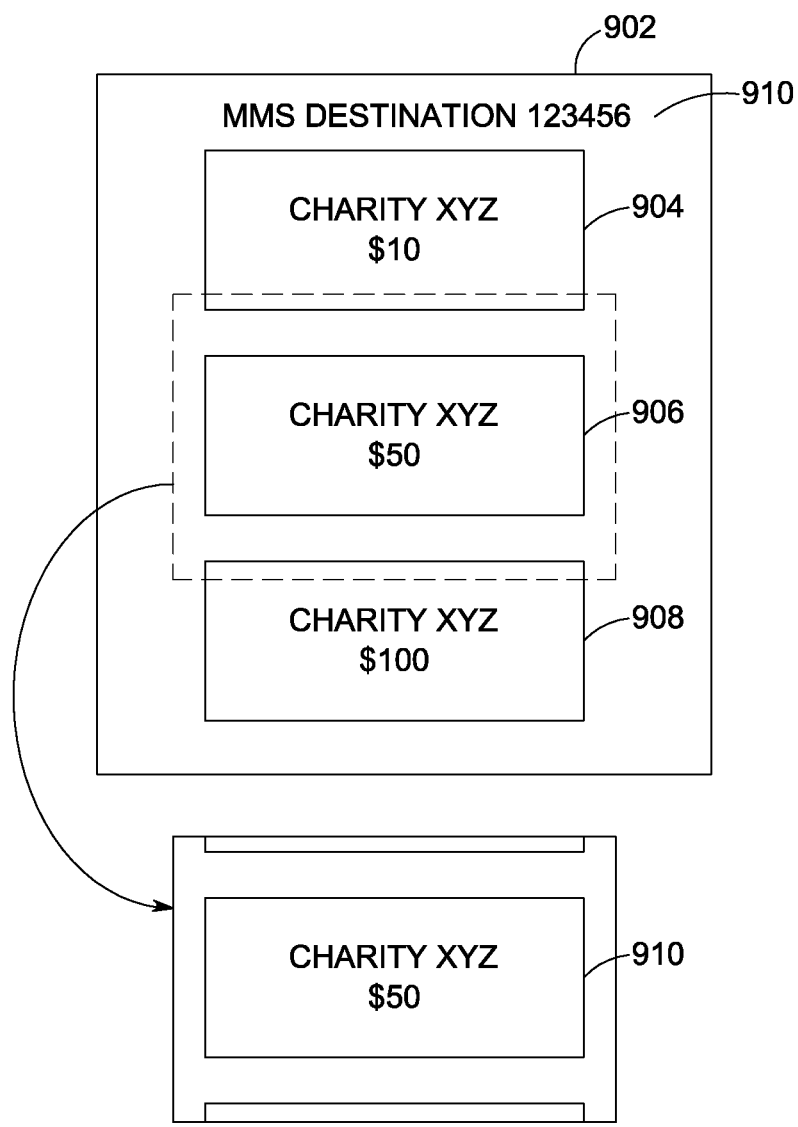
FIG. 9 is an example of an advertisement and a picture for use with the picture-based donation system.

In an alternative embodiment, instead of a text message, a process 800 utilizing an MMS message as described hereinafter may be implemented as described in FIG. 8. An advertisement 902, (such as a print add as shown in FIG. 9), a billboard or the like, includes an MMS address 910 associated with a non-profit organization, (step 802), such as the name of the non-profit organization, a symbol of the non-profit organization or a barcode or QR encoding information indicating the non-profit organization. The advertisement 902 may also include information indicating one or more donation amounts 904, 906, 908.

A user of a mobile device takes a picture (shown in the lower portion of FIG. 9) of the advertisement 902 or a portion of the advertisement 902, (step 804). The user sends the picture to the MMS address 910 indicated in the advertisement 902, (step 806). Alternately, the image may be sent with an application on the mobile device. The server/processing device 310 scans the image to identify the non-profit organization and/or the amount of the donation and uses this information as it did the parsed email from the text messages as previously described, (step 808).

As shown in FIG. 9, an example advertisement 902 may have an MMS destination number 910 to which the donation is to be sent. The advertisement 902 also may have various donation amounts 904, 906, 908 for charity XYZ. A user will take a picture 910 of a selected donation amount, such as amount 906. The picture will become the content of the MMS message sent to the server/processing device 310.

Figure 10:
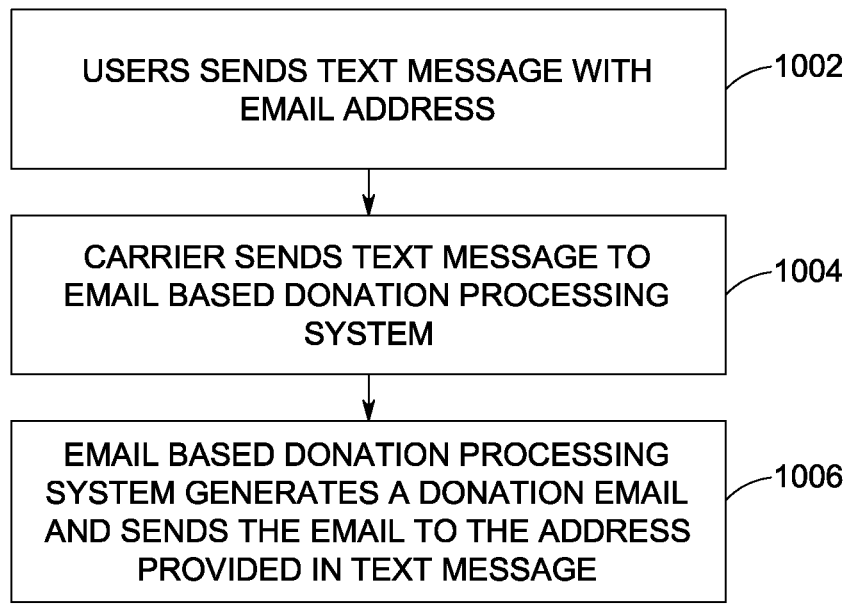
FIG. 10 is a flow diagram of a text-initiated donation system.
Figure 11:
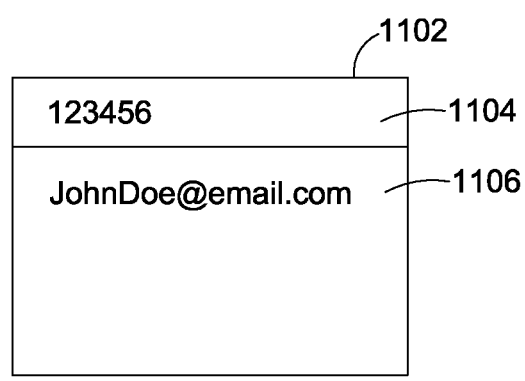
FIG. 11 is an example text for use with the text-initiated donation system.

FIG. 10 is a flow diagram of an alternative method 1000 of implementing a mobile donation system initiated by text messages, such a text message 1102 of FIG. 11. The user identifies an entity, such as a non-profit entity, to which the user wishes to make a donation. The user sends a text message 1102 to a destination address 1104 associated with the non-profit entity, (step 1002). The number may be a 4-6 digit number, a conventional number, or a number shorter or longer than 4-6 digits. In the body of the text message 1106, the user may provide additional information such as an email address and an amount of the donation (not shown).

The text message 1102 is received by the mobile carrier and sent to a server/processing device 310 associated with the text message number. The server/processing device 310 forwards a message (step 1004) to the email-based donation server 606, such as an Internet Protocol (IP) message, for processing. The email-based donation server 606, as described with reference to FIG. 6, may then process the message. Alternatively, the donation may be processed by an email-based donation processing system, such as described in U.S. patent application Ser. Nos. 13/074,222, 13/074,235 and 61/524,898.

Figure 12:
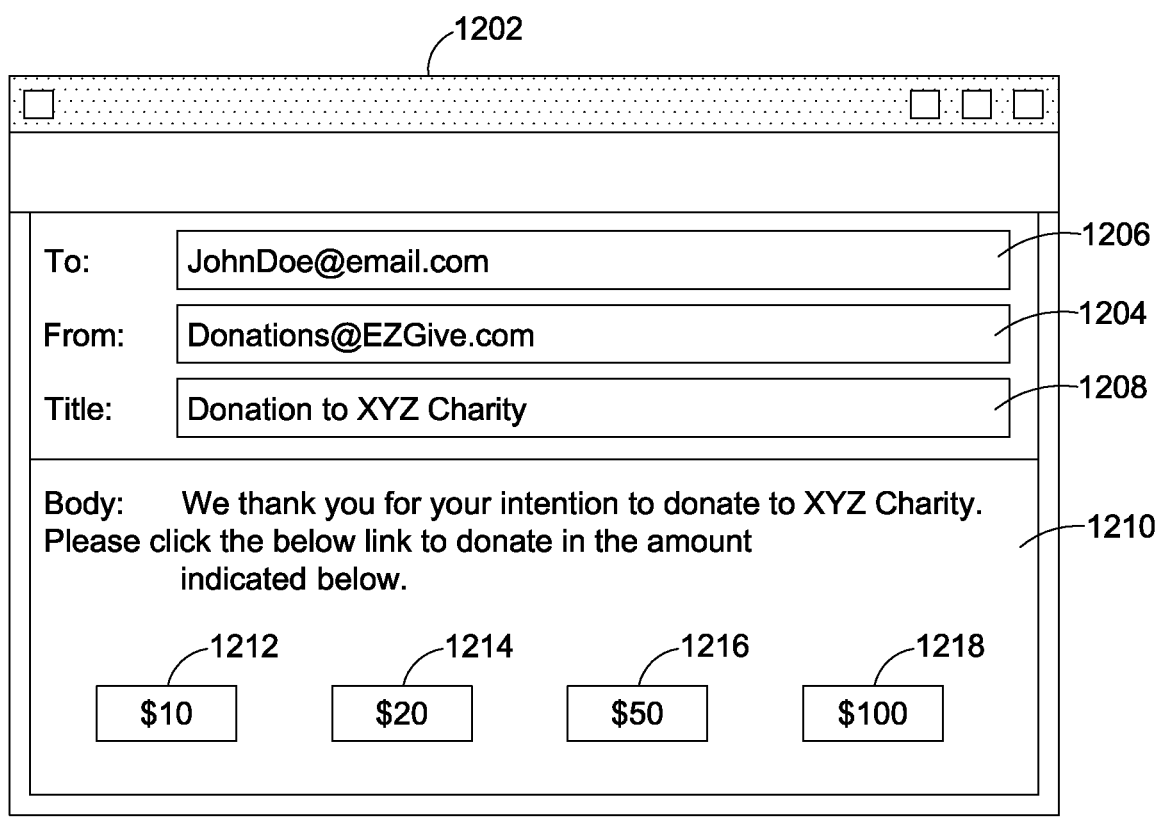
FIG. 12 is an example email for use with the text-initiated donation system.
Figure 13:
FIG. 13 is an example of the system implemented on a smartphone.
Figure 14:
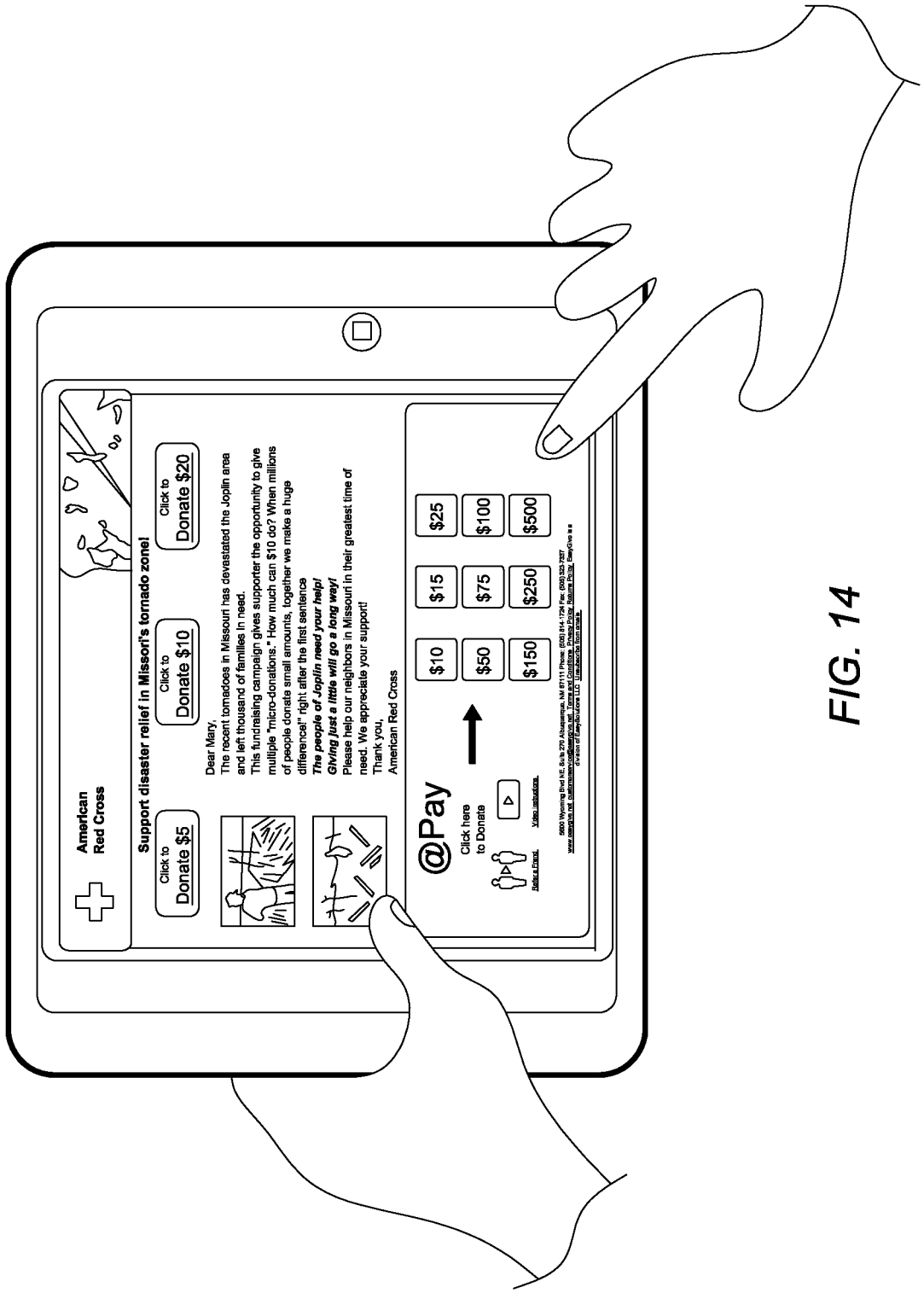
FIG. 14 is an example of the system implemented on a tablet computer.

The message may include an indication of the entity associated with the recipient text message number, the donation amount and the email address included in the text message. The donation server 606 sends a donation request email to the user, either directly, (or via another electronic messaging format), though the conversion server 604 so that the user can make a donation, (step 1006). Although the example is in the form of an email 1202 shown in FIG. 12, other forms of electronic communication may also be utilized as described hereinbefore. The donation request email has a from address 1204, a to address 1206, a title 1208, a body 1210 providing instructions to make a donation using the email and selectable links 1212, 1214, 1216 and 1218 so that the user can make a donation. As shown in FIG. 12, the user can select a desired donation amount from the multiple selectable links 1212, 1214, 1216 and 1218.

The above described processes and systems make it easy for regular cellular phones to operate (i.e. make donations) with donation and financial transaction systems, such as an email-based donation system. They enable new capabilities, such as: a) enabling non-solicited donations; and b) extending reach to include both cell phones and smartphones.

Although the processes described hereinbefore were initiated by the user of the mobile device generating an SMS, an email or an MMS, it should be understood that all of the processes may begin with the user responding to an SMS, an email or an MMS by the non-profit organization. This alleviates the burden of the user from entering specific information into the mobile device, which is often fraught with errors due to their small size. Additionally, although the alternative systems have been described hereinbefore as comprising separate physical components for ease of explanation of the various functions, the components may be different hardware or software modules of the same physical component.

Although features and elements are described above in particular combinations, each feature or element can be used alone or in any combination with or without the other features and elements. For example, each feature or element as described above with reference to any of the Figures may be used alone without the other features and elements or in various combinations with or without other features and elements. Sub-elements of the methods and features described above with reference to the Figures may be performed in any arbitrary order (including concurrently), in any combination or sub-combination.

What is claimed is:

1. A method for improving security of a transaction that spans a plurality of computer networks by utilizing Short Message Service (SMS) and Simple Mail Transfer Protocol (SMTP), the method comprising:
   receiving, by a processor, a SMS message from a mobile device of a user via a phone number, wherein the SMS message is received using a first communication interface that is communicatively coupled to a first network of the plurality of computer networks, wherein the SMS message is associated with the transaction and the phone number is associated with a plurality of potential recipients of a transfer of funds for the transaction;
   determining, by the processor, a particular recipient for the transfer of the funds for the transaction from the plurality of potential recipients based on content of the SMS message;
   transmitting, by the processor, an email response message via the first network to an email address of the user using SMTP based on the SMS message, wherein the email response message includes a link that contains information indicating an amount of the transaction and identifies the particular recipient;
   receiving, by the processor, a confirmation email message that authorizes the transaction from the mobile device via the first network, wherein the confirmation email message is transmitted via SMTP in response to the link included in the email response message; and
   in response to receiving the confirmation email message, initiating, by the processor, the transfer of the funds in the amount of the transaction from an account of the user to the particular recipient using a second communication interface that is communicatively coupled to a second network of the plurality of computer networks, wherein the second network includes a server of a financial institution.

2. The method of claim 1 further comprising identifying the account of the user based on an originating number of the SMS message.

3. The method of claim 1 further comprising parsing the SMS message to identify the account of the user based an account identifier included in a body of the SMS message.

4. The method of claim 1 further comprising parsing the SMS message to identify the amount of the transaction.

5. The method of claim 1, wherein the email address of the user is determined based on the SMS message.

6. A non-transitory computer readable storage medium that stores instructions for improving security of a transaction that spans a plurality of computer networks by utilizing Short Message Service (SMS) messages and Simple Mail Transfer Protocol (SMTP), the instructions when executed by a processor cause the processor to execute a method, the method comprising:
   receiving, by the processor, a SMS message from a mobile device of a user via a phone number, wherein the SMS message is received using a first communication interface that is communicatively coupled to a first network of the plurality of computer networks, wherein the SMS message is associated with the transaction and phone number is associated with a plurality of potential recipients of a transfer of funds for the transaction;
   determining, by the processor, a particular recipient for the transfer of the funds for the transaction from the plurality of potential recipients based on contents of the SMS message;
   transmitting, by the processor, an email response message to an email address of the user via the first network based on the SMS message using SMTP, wherein the email response message includes a link that includes information indicating an amount of the transaction and identifies the particular recipient;
   receiving, by the processor, a confirmation email message that authorizes the transaction from the mobile device via the first network, wherein the confirmation email message is transmitted via SMTP in response to activation of the link included in the email response message; and
   in response to receiving the confirmation email message, initiating, by the processor, the transfer of the funds in the amount of the transaction from an account of the user to the particular recipient using a second communication interface that is communicatively coupled to a second network of the plurality of computer networks, wherein the second network includes a server of a financial institution.

7. The non-transitory computer readable storage medium of claim 6, wherein the method further includes:
   identifying, by the processor, the account of the user in response to an originating number of the SMS message.

8. The non-transitory computer readable storage medium of claim 6, wherein the contents of the SMS includes a body portion that indicates the account of the user.

9. The non-transitory computer readable storage medium of claim 6 wherein the contents of the SMS include a body portion that indicates the amount of the transaction.

10. The non-transitory computer readable storage medium of claim 6, wherein the email address of the user is determined based on the SMS message.

11. A system for improving security of a transaction that spans a plurality of computer networks by utilizing Short Message Service (SMS) and Simple Mail Transfer Protocol (SMTP), the system comprising:
   a first communication interface that is communicatively coupled to a mobile device via a first network from the plurality of computer networks;

a second communication interface that is communicatively coupled to server of a financial institution via a second network from the plurality of computer networks; and a processor that is communicatively coupled to the first communication interface and the second communication interface, wherein the processor:

receives, using the first communication interface, an SMS message from the mobile device of a user via a phone number, wherein the SMS message is associated with the transaction and the phone number is associated with a plurality of potential recipients of a transfer of funds for the transaction, determine a particular recipient for the transfer of the funds for the transaction from the plurality of potential recipients based on contents of the SMS message, transmits, using the first communication interface, an email response message to an email address of the user via SMTP based on the SMS message received, wherein the email response message includes a link that contains information indicating an amount of the transaction and identifies the particular recipient, receives, using the first communication interface, a confirmation email message that authorizes the transaction from the mobile device via SMTP, wherein the confirmation email message is generated in response to activation of the link included in the email response message, and in response to receiving the confirmation email message, initiates the transfer of the funds in the amount of the transaction from an account of the user to the particular recipient using the second communication interface.

12. The system of claim 11 wherein the processor further: identifies the account of the user in response to an originating number of the SMS message.

13. The system of claim 11 wherein the processor further: parses the SMS message to identify the account of the user based an account identifier included in a body portion of the content of the SMS message.

14. The system of claim 11 wherein the processor further: parses the SMS message to identify the amount of the transaction.

15. The system of claim 11, wherein the email address of the user is determined based on the SMS message.

* * * * *